US012812686B2

(12) United States Patent
Ahmed et al.

(10) Patent No.: US 12,812,686 B2
(45) Date of Patent: Nov. 24, 2026

(54) ENABLING PHYSICAL RANDOM-ACCESS CHANNEL REPETITION COMBINING IN A RADIO UNIT FOR AN O-RAN-BASED RADIO ACCESS NETWORK

(71) Applicant: Mavenir Systems, Inc., Richardson, TX (US)

(72) Inventors: Wessam Afifi Ahmed, Plano, TX (US); Lei Zhang, Sundbyberg (SE); Fan Yang, Beijing (CN); Johan Zhang, Solna (SE)

(73) Assignee: Mavenir Systems, Inc., Richardson, TX (US)

( * ) Notice: Subject to any disclaimer, the term of this patent is extended or adjusted under 35 U.S.C. 154(b) by 270 days.

(21) Appl. No.: 18/585,750

(22) Filed: Feb. 23, 2024

(65) Prior Publication Data

US 2024/0196445 A1 Jun. 13, 2024

Related U.S. Application Data

(63) Continuation of application No. PCT/CN2021/116141, filed on Sep. 2, 2021.

(51) Int. Cl.
*H04W 74/0833* (2024.01)
*H04L 1/08* (2006.01)

(52) U.S. Cl.
CPC ........... *H04W 74/0833* (2013.01); *H04L 1/08* (2013.01)

(58) Field of Classification Search
CPC .. H04W 74/0833; H04W 88/085; H04L 1/08; H04L 5/0048
See application file for complete search history.

(56) References Cited

U.S. PATENT DOCUMENTS

2021/0006944 A1 1/2021 Raghothaman et al.
2021/0306874 A1 9/2021 Bedekar
2023/0336295 A1* 10/2023 Sung .................... H04L 5/0048

FOREIGN PATENT DOCUMENTS

CN 112913272 A 6/2021
WO 2021112747 A1 6/2021

OTHER PUBLICATIONS

O-RAN Alliance, "LS on O-RAN Alliance & 3GPP Coordination on O-RAN Alliance Outputs", 3GPP TSG RAN WG1 Meeting #98bis R1-1909948,Oct. 20, 2019 (Oct. 20, 2019).
International Search Report and Written Opinion for corresponding International (PCT) application PCT/CN2021/116141, 8 pages, dated Mar. 28, 2022.
Extended European search report for corresponding European patent application, 21955281.7; 9 pages, dated Mar. 18, 2025.

(Continued)

*Primary Examiner* — Kibrom T Hailu
(74) *Attorney, Agent, or Firm* — Ruggiero McAllister & McMahon LLC

(57) ABSTRACT

There is provided a method of operating an Open Radio Access Network (O-RAN). The method includes (a) communicating from an O-RAN radio unit (O-RU) to an O-RU controller, data informing that the O-RU supports physical random-access channel (PRACH) combining, (b) communicating from the O-RU controller to the O-RU, a parameter to facilitate the PRACH combining, and (c) configuring the O-RU in accordance with the parameter. There is also provided an O-RU and an O-RU controller that perform the method.

24 Claims, 7 Drawing Sheets

(56) References Cited

OTHER PUBLICATIONS

O-RAN Alliance; O-RAN.WG4.CUS.0-v05.00, Technical Specification "O-RAN Fronthaul Working Group; Control, User and Synchronization Plane Specification" O-RAN Alliance, Feb. 2021, Alfter, Germany.

* cited by examiner

| | | | |
|---|---|---|---|
| ef | extType =0x15 | 1 | Octet N |
| extLen =0x01(1 word) | | 1 | Octet N+1 |
| TD/FD | combMask[5:11] | 1 | Octet N+2 |
| combMask[0:4] | reserved | 1 | Octet N+3 |
| PowerScaler[8:15] | | 1 | Octet N+4 |
| PowerScaler[0:7] | | 1 | Octet N+5 |
| Reserved | | 1 | Octet N+6 |
| Reserved | | 1 | Octet N+7 |

FIG. 4

| | | | | |
|---|---|---|---|---|
| ef | extType =0x15 | | 1 | Octet N |
| extLen =0x01(1 word) | | | 1 | Octet N+1 |
| reserved | numCombSize | TD/FD | 1 | Octet N+2 |
| PowerScaler[8:15] | | | 1 | Octet N+3 |
| PowerScaler[0:7] | | | 1 | Octet N+4 |
| Reserved | | | 1 | Octet N+6 |
| Reserved | | | 1 | Octet N+7 |
| Reserved | | | 1 | Octet N+7 |

FIG. 5

| | | | | |
|---|---|---|---|---|
| ef | extType =0x15 | | 1 | Octet N |
| extLen =0x01(1 word) | | | 1 | Octet N+1 |
| reserved | numCombGroup | TD/FD | 1 | Octet N+2 |
| PowerScaler[8:15] | | | 1 | Octet N+3 |
| PowerScaler[0:7] | | | 1 | Octet N+4 |
| Reserved | | | 1 | Octet N+7 |
| Reserved | | | 1 | Octet N+7 |
| Reserved | | | 1 | Octet N+7 |

FIG. 6

| PRACH format | numCombSize | repetition times |
|---|---|---|
| A1 | 2/1 | 2 |
| A2 | 4/2/1 | 4 |
| A3 | 6/3/2/1 | 6 |
| B1 | 2/1 | 2 |
| B2 | 4/2/1 | 4 |
| B3 | 6/3/2/1 | 6 |
| B4 | 12/6/4/3/1 | 12 |
| C0 | 1 | 1 |
| C2 | 4/2/1 | 4 |

FIG. 7

ENABLING PHYSICAL RANDOM-ACCESS CHANNEL REPETITION COMBINING IN A RADIO UNIT FOR AN O-RAN-BASED RADIO ACCESS NETWORK

CROSS REFERENCE TO RELATED APPLICATIONS

This application is a continuation of International (PCT) Application PCT/CN2021/116141, filed Sep. 2, 2021 and published as WO 2023/028935 A1, the entire contents of all of which are incorporated herein by reference.

BACKGROUND

1. Field of the Disclosure

The present disclosure relates to a Radio Access Network (RAN) design for 4G and 5G based mobile networks, and more particularly, to a system and methods for enabling physical random-access channel (PRACH) repetition combining at an open radio unit (O-RU) at both the time-domain and the frequency-domain in an Open RAN (O-RAN) based RAN.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

Traditionally, RANs were built as an integrated unit where the entire RAN was processed. The RAN traditionally uses application specific hardware for processing, making it difficult to upgrade and evolve. As future networks evolve to have massive densification of networks to support increased capacity requirements, there is a growing need to reduce the CAPEX/OPEX costs of RAN deployment and make the solution scalable and easy to upgrade.

In a cloud-based RAN, a significant portion of the RAN layer processing is performed at a central unit (CU) and a distributed unit (DU). Both CUs and DUs are also known as the baseband units (BBUs). CUs are usually located in the cloud on commercial off the shelf servers, while DUs can be distributed. Radio frequency (RF) and real-time critical functions can be processed in the remote radio unit (RU).

3GPP has defined multiple PRACH formats with different lengths. Long formats include formats 0, 1, 2, and 3, with 1, 2, 4, and 4 repetitions, respectively. Short formats include (a) formats A1, A2, and A3, with 2, 4, and 6 repetitions, respectively, (b) formats B1, B2, B3, and B4 with 2, 4, 6, and 12 repetitions, respectively, and (c) formats C0 and C2, with 1 and 4 repetitions, respectively.

The O-RAN specifications provide a way for the O-DU or a service management and orchestration (SMO) unit to configure the O-RU to send the PRACH repetitions to the O-DU. However, the specifications do not provide a way to instruct the O-RU to combine the PRACH repetitions locally in the O-RU and send the combined signal to the O-DU.

The prior art has at least two problems. First, it may add overhead to the fronthaul interface since the O-RU needs to send each and every repetition to the O-DU. Specifically, in case of a lower layer fronthaul based on split option 7-2x, the frequency domain RACH samples data rate on fronthaul can be high, especially for massive MIMO application. With a high-density RACH configuration, it can occupy more than 1 Gbps bandwidth for the fronthaul interface. Second, in some cases, not performing the combining at the O-RU may increase the complexity at the O-RU by executing several FFTs.

In the prior art, there is no solution to achieve coherent combining at the O-RU for an O-RAN based network.

For background, below, we describe two prior art methods of configuring the O-RU to send the PRACH signals, i.e., all PRACH repetitions, to the O-DU.

Static PRACH Configuration—M-Plane

The first prior art method is static PRACH configuration—M-plane. Since PRACH is periodic, its location in time and frequency resources is constant for all periods. It is therefore possible to configure PRACH via M-plane. To do that, an SMO/O-RU controller needs to configure the following aspects:

- a) Configuration of frequency resources assigned to PRACH.
- b) Configuration of time resources assigned to PRACH including PRACH periodicity.
- c) Configuration of compression, FFT, and SCS.
- d) Assignment of HW resources (low-level-rx-endpoints) for processing of PRACH.

Static configurations shall be provided to the O-RU as part of carrier configuration before the configured carrier is activated.

The O-RU exposes its ability to support static PRACH configuration by support of the feature PRACH-STATIC-CONFIGURATION-SUPPORTED in o-ran-module-cap.yang module. The presence of this feature means, that at least one of static-low-level-rx-endpoints offered by the O-RU supports static configuration for PRACH.

The static PRACH configuration includes:

- a) Static-prach-config-id
- b) pattern-period: Period after which static PRACH patterns are repeated. Unit: number of frames
- c) guard-tone-low-re: Number of REs occupied by the low guard tones
- d) num-prach-re: Number of contiguous PRBs per data section description
- e) guard-tone-high-re: Number of REs occupied by the high guard tones
- f) sequence-duration: Duration of single sequence of the PRACH. Sequence may be considered as 'single PRACH symbol'
- g) prach-patterns:
  - 1) prach-pattern-id
  - 2) number-of-repetitions
  - 3) number-of-occasions
  - 4) re-offset
  - 5) occasion-parameters
    - i) occasion-id
    - ii) cp-length
    - iii) gp-length
    - iv) beam-id
  - 6) frame-number
  - 7) sub-frame-id
  - 8) time-offset Real-Time PRACH Configuration—C-Plane The second prior art method is real-time PRACH configuration—C-plane, which configures the O-RU in real-time with the control parameters needed to process and send the PRACH signal to the O-DU. This is achieved by sending section type 3 with the following parameters:

- a) frameId: Frame ID
- b) subframeId: Subframe ID c) slotId: Slot ID
d) startSymbolId: Start symbol ID
e) timeOffset: Time Offset
f) frameStructure (FFT size and SCS): Frame structure (Fast Fourier Transform size and subcarrier spacing)
g) cpLength: Cyclic prefix length
h) startPrb: Start physical resource block
i) numPrb: Number of Physical resource blocks
j) freqOffset: Frequency offset
k) numSymbol The O-RU uses these parameters to receive and process the PRACH signal and send it to the O-DU.

SUMMARY

The present disclosure provides a system and methods for enabling PRACH repetition combining at the O-RU at both time-domain and frequency-domain. The system and methods reduce the fronthaul data rate and latency related to the RACH samples from O-RU to O-DU and can possibly bring cycle-saving benefits for the O-RU, and improve performance of RACH detection significantly. The present disclosure focuses on PRACH formats with at least 2 PRACH repetitions. The combining benefits will be mainly related to the short PRACH formats.

The method includes (a) communicating from an O-RAN radio unit (O-RU) to an O-RU controller, data informing that the O-RU supports physical random-access channel (PRACH) combining, (b) communicating from the O-RU controller to the O-RU, a parameter to facilitate the PRACH combining, and (c) configuring the O-RU in accordance with the parameter.

BRIEF DESCRIPTION OF THE DRAWINGS

FIG. 4 shows an example of a section extension type 21 data format including coherent combining parameters.

FIG. 5 shows an example embodiment in which numCombSize is used to indicate the number of repetitions to be combined at an O-RU.

FIG. 6 shows an example in which numCombGroup is used to indicate the repetitions to be combined at an O-RU.

FIG. 7 shows different possible values for the numCombSize field and number of repetition times for various short PRACH formats.

DETAILED DESCRIPTION

A component or a feature that is common to more than one drawing is indicated with the same reference number in each of the drawings.

According to the NR 3GPP specification, a maximum of 12 repetition can be configured for RACH short preamble, which implies, in non-high-speed scenario for RACH IQ samples, a coherent combining between repetitions can be performed in the O-RU. The combining should be linear accumulation between repetitions, with scaling to maintain the thermal noise as power invariant, and it can be performed in either time domain before FFT or frequency domain after FFT, before sending to O-DU.

Figure 1:
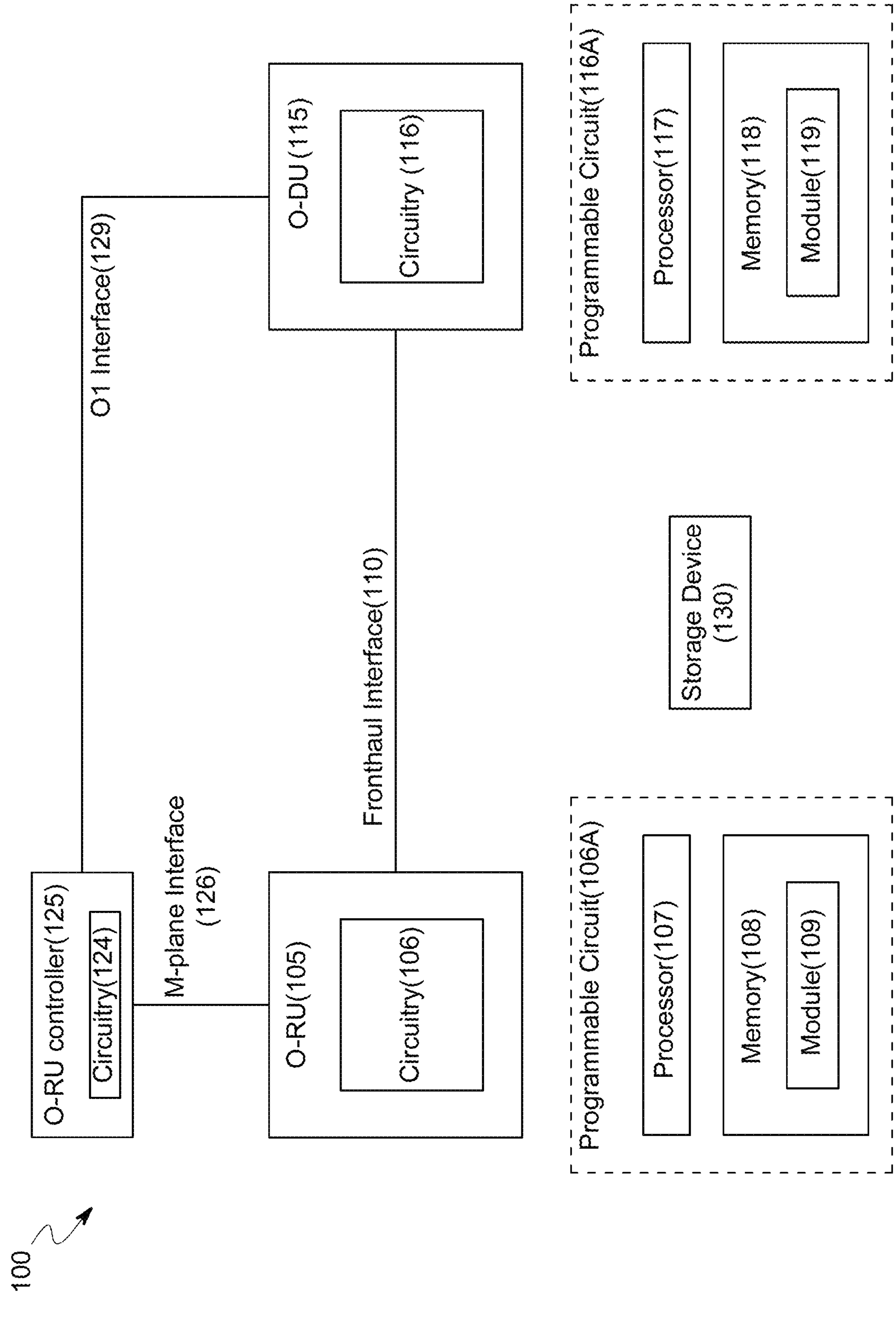
FIG. 1 is a block diagram of a system 100 for enabling PRACH combining at the O-RU for an O-RAN-based RAN.

The present disclosure provides a system and methods for enabling PRACH repetition combining at the O-RU at both time-domain and frequency-domain. The methods can be summarized as follows:

a) O-RU can report as part of its capabilities if it supports:
  1) PRACH repetition combining at time-domain
  2) PRACH repetition combining at frequency-domain
  3) Maximum number of PRACH repetitions that can be combined in time-domain
  4) Maximum number of PRACH repetitions that can be combined in frequency-domain
  5) Maximum supported power scaler value
b) For static PRACH combining via M-plane, an SMO/O-RU controller can configure the O-RU with:
  1) The combining domain: Time-domain or frequency-domain
  2) The number of repetitions to be combined together
  3) The repetition indices to be combined in the same group
  4) Combining masks, which inform the O-RU with the indices of the repetitions that need to be combined.
  5) Power scaler parameter to scale the combined signal
c) To achieve maximum flexibility, C-plane message is chosen as carrier to configure O-RU for this repetition reduction. The section extension type is defined for repetition combining granularity for C-plane message of section type 3. Without explicitly announcing, all the C-plane message referred in the following is for section type 3.
d) In an alternative embodiment, a section extension can be sent with other section types, e.g., section type 1, if used for PRACH signaling.
e) If all repetitions are combined in O-RU, a maximum 12 times fronthaul data rate reduction can be achieved for RACH transport for each RACH occasion. In addition, when this combining is executed in time domain before FFT, a maximum 12 times cycles are saved for high repetition RACH for each RACH occasion.
f) For real-time PRACH configuration via C-plane, define a section extension that can include the following fields:
  1) extType
  2) extLen
  3) The combining domain: Time-domain or frequency-domain
  4) The number of repetitions to be combined together
  5) The repetition indices to be combined in the same group
  6) The combining mask, which indicates to the O-RU the specific repetitions that need to be combined together
  7) Power scaler parameter to scale the combined signal FIG. 1 is a block diagram of a system 100 for enabling PRACH combining at the O-RU for an O-RAN-based RAN. System 100 includes an O-RU 105 and an O-DU 115 that are communicatively coupled via a fronthaul interface 110, also referred to herein as FH 110. A variety of data is communicated via FH 110, including DL and UL U-plane data packets, DL C-plane messages, which include data sections and section extension data. A message is a carrier of data. O-DU 115 instructs O-RU 105 using M-plane and/or C-plane messages, on how to process received messages from O-DU 115 (so that O-RU 105 can send to UE) and on how to send messages (i.e., messages received from UE) to O-DU 115. O-RU 105 and O-DU 115 cooperate with one another to perform a method that enables PRACH combining in the context of FH 110.

O-RU 105 represents mainly an O-RAN-compliant O-RU that executes the lower physical layer blocks such as FFT/IFFT, CP removal/addition, beamforming, analog to digital converter, digital to analog convertor, and RF functions.

O-RU 105 includes electronic circuitry, namely circuitry 106, that performs operations on behalf of O-RU 105 to execute methods described herein. Circuitry 106 may be implemented with any or all of (a) discrete electronic components, (b) firmware, and (c) a programmable circuit 106A.

Programmable circuit 106A, which is an optional implementation of circuitry 106, includes a processor 107 and a memory 108. Processor 107 is an electronic device configured of logic circuitry that responds to and executes instructions. Memory 108 is a tangible, non-transitory, computer-readable storage device encoded with a computer program. In this regard, memory 108 stores data and instructions, i.e., program code, that are readable and executable by processor 107 for controlling operations of processor 107. Memory 108 may be implemented in a random-access memory (RAM), a hard drive, a read only memory (ROM), or a combination thereof. One of the components of memory 108 is a program module, namely module 109. Module 109 contains instructions for controlling processor 107 to execute operations described herein on behalf of O-RU 105.

O-DU 115 represents an O-RAN compliant O-DU that executes functions such as higher physical layer (based on O-RAN split or similar lower layer splits), MAC, scheduler, and RLC. O-DU 115 can be implemented on proprietary hardware or COTS (commercial over the shelf servers), and it can be on the cloud.

O-DU 115 includes electronic circuitry, namely circuitry 116, that performs operations on behalf of O-DU 115 to execute methods described herein. Circuitry 116 may be implemented with any or all of (a) discrete electronic components, (b) firmware, and (c) a programmable circuit 116A.

Programmable circuit 116A, which is an optional implementation of circuitry 116, includes a processor 117 and a memory 118. Processor 117 is an electronic device configured of logic circuitry that responds to and executes instructions. Memory 118 is a tangible, non-transitory, computer-readable storage device encoded with a computer program. In this regard, memory 118 stores data and instructions, i.e., program code, that are readable and executable by processor 117 for controlling operations of processor 117. Memory 118 may be implemented in a random-access memory (RAM), a hard drive, a read only memory (ROM), or a combination thereof. One of the components of memory 118 is a program module, namely module 119. Module 119 contains instructions for controlling processor 117 to execute operations described herein on behalf of O-DU 115.

The term "module" is used herein to denote a functional operation that may be embodied either as a stand-alone component or as an integrated configuration of a plurality of subordinate components. Thus, each of module 109 and module 119 may be implemented as a single module or as a plurality of modules that cooperate with one another.

While modules 109 and 119 are indicated as being already loaded into memories 108 and 118, respectively, either or both of modules 109 and 119 may be configured on a storage device 130 for subsequent loading into their respective memories 108 and 118. Storage device 130 is a tangible, non-transitory, computer-readable storage device that stores either or both of modules 109 and 119 thereon. Examples of storage device 130 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled to O-RU 105 and/or O-DU 115 via a data communications network.

FH 110 is a connection link between O-DU 115 and O-RU 105 that carries control user synchronization (CUS)-plane packets as well as M-plane packets.

System 100 also includes an O-RU controller 125, an M-plane interface 126, and an O1 interface 129. M-plane interface 126 is a communicative link between O-RU controller 125 and O-RU 105. O1 interface 129 is a communicative link between O-RU controller 125 and O-DU 115.

O-RU controller 125 is a controller that controls operations of O-RU 105 by exchanging M-plane messages with O-RU 105. O-RU 105 reports its capabilities to O-RU controller 125. Subsequently, O-RU controller 125 configures O-RU 105 to operate via M-plane. The exchange of M-plane messages between O-RU controller 125 and O-RU 105 can be accomplished by way of two possible paths, namely (1) via M-plane interface 126, or (2) via O1 interface 129, O-DU 115, and FH 110. Thus, O-RU 105 can report its capabilities to O-RU controller 125, and O-RU controller 125 can send management configuration data to O-RU 105, either (a) directly, via M-plane interface 126, in a hybrid M-plane architecture, or (b) indirectly, via O1 interface 129, O-DU 115 and FH 110, in a hierarchical architecture or hybrid architecture. Communicating means transferring data from a sender to a receiver, e.g., from O-RU 105 to O-RU controller 125, or vice versa. The communicating may be directly from the sender to the receiver, e.g., from O-RU controller 125 to O-RU 105 via M-plane interface 126, or via an intermediary device, e.g., from O-RU controller 125 to O-RU 105 via O-DU 115.

O-RU controller 125 includes electronic circuitry, namely circuitry 124, that performs operations on behalf of O-RU controller 125 to execute methods described herein. Circuitry 124 may be implemented with any or all of (a) discrete electronic components, (b) firmware, and (c) a programmable circuit. Circuitry 124 may be implemented similarly to programmable circuit 116A, i.e., with a processor and a memory that contains instructions that are readable by the processor to control the processor to execute operations on behalf of O-RU controller 125, and the instructions may be stored on storage device 130.

Although O-RU controller 125 is shown as being a stand-alone device, as an alternative to being a stand-alone device, O-RU controller 125 can reside in any of O-DU 115, a service management and orchestration system (SMO) (not shown), or a network management system (NMS) (not shown).

The SMO is responsible for RAN domain management. The key capabilities of the SMO are:

(a) FCAPS interface to O-RAN network functions;
(b) Non-RT RIC for RAN optimization; and
(c) O-Cloud management, orchestration and workflow management.

The SMO performs these services through four key interfaces to the O-RAN elements:

(i) A1 Interface between the Non-RT RIC in the SMO and the Near-RT RIC for RAN optimization;
(ii) O1 Interface between the SMO and the O-RAN network functions for FCAPS support;
(iii) In the hybrid model, open fronthaul M-plane interface between SMO and O-RU for FCAPS support; and
(iv) O2 Interface between the SMO and the O-Cloud to provide platform resources and workload management.

The NMS performs FCAP functions and interface for managing network elements.

Figure 2:
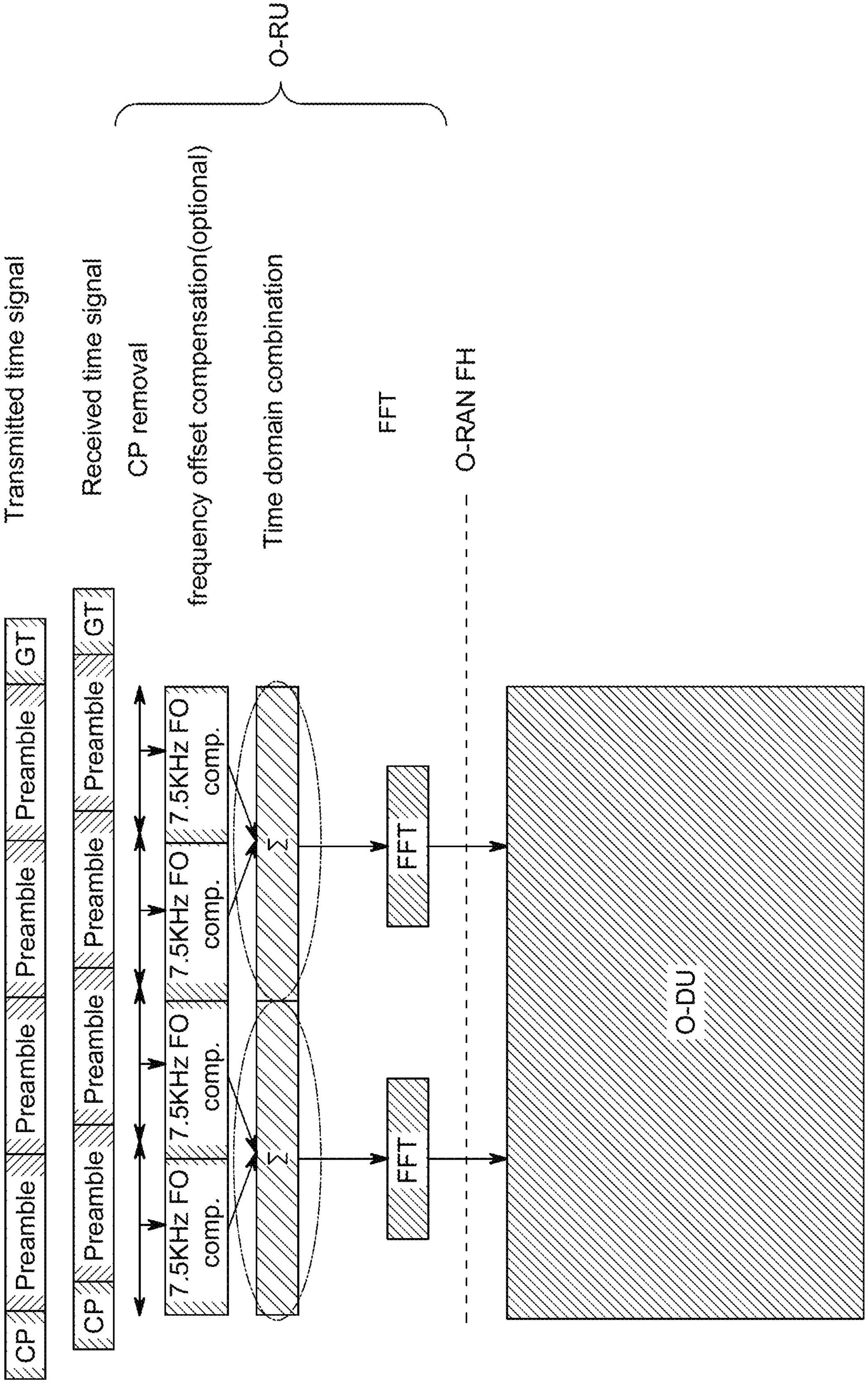
FIG. 2 shows an example of time-domain combination on the O-RU side.

FIG. 2 shows an example of time-domain combination on the O-RU side. The preamble repetition time is 4 and the numCombSize, i.e., number of repetitions that need to be combined at O-RU 105, is 2. As result, four preambles are split into two groups, and each group has two repetitions. Time-domain combination is performed before FFT for each group. The 7.5 KHz frequency offset compensation block is optional depending on configurations and its location can be O-RU-implementation-specific.

Figure 3:
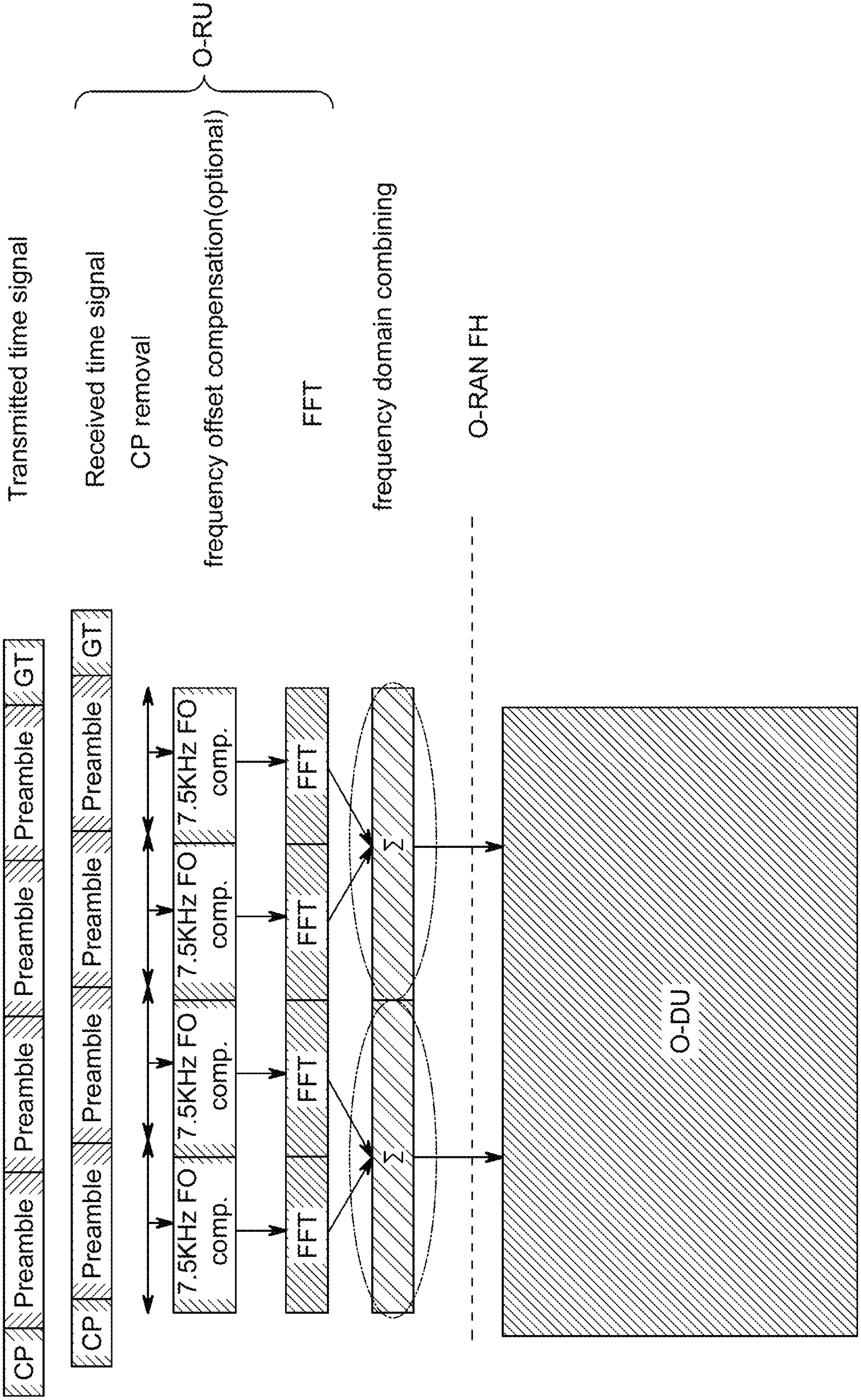
FIG. 3 shows an example of frequency-domain combination on the O-RU side.

FIG. 3 shows an example of frequency-domain combination on the O-RU side. Similar to FIG. 2, the preamble repetition time is 4 and the numCombSize is 2. As a result, the FFT outputs of four preambles are split into two groups, and each group has two preambles' FFT outputs. Then, frequency domain combination is performed for each group. The 7.5 KHz frequency offset compensation block is optional depending on configurations and its location can be O-RU-implementation-specific.

O-RU 105 can report as part of its capabilities if it supports:

a) PRACH repetition combining at time-domain
b) PRACH repetition combining at frequency-domain
c) Maximum number of PRACH repetitions that can be combined in time-domain
d) Maximum number of PRACH repetitions that can be combined in frequency-domain
e) Maximum supported power scaler value in time-domain
f) Maximum supported power scaler value in frequency-domain One or more of the above parameters can be included in the capability YANG module, where O-RU 105 includes its supported features and capabilities.

The o-ran-module-cap.yang module (i.e., capability YANG module) is a data model that includes the capabilities of the O-RU.

Real-Time Combining Methods (Via C-Plane)

To make coherent combining in O-RU 105 possible, O-DU 115 sends extra control information to inform O-RU 105 how the combining is to be performed in addition to the fields of section type 3, such as startSymbolId and numSymbol. For each sectionId connected data and control message, a section extension type 21 can be included.

FIG. 4 shows an example of a section extension type 21 data format including coherent combining parameters, and more specifically, where combMask is used to indicate to O-RU 105 the repetitions to be combined.

The extension type number 21 is provided just as an example. In practice, the number can be any positive integer from 21 to 127, inclusive.

O-DU 115 can include one or more of the following parameters in the section extension 21 that is sent to O-RU 105 to instruct it to perform PRACH repetition combining:

ef (extension flag): This parameter is used to indicate if there is another extension present (ef=1) or this is the last extension (ef=0).

extType (extension type): This parameter provides the extension type which provides additional parameters specific to the subject data extension.

extLen (extension length): This parameter provides the length of the section extension in units of 32-bit (or 4-byte) words. The value zero is reserved, so there is always at least one word in the extension (the word containing the extType and extLen).

TD/FD: This parameter is the flag indicating the coherent combining should be performed, 0 for time domain, 1 for frequency domain. If freqOffset field is configured as non-zero value, O-RU 105 can only apply this combining after frequency offset compensation with TD/FD configured as 0.

Value range: {0b=Time-domain Combining, 1b=Frequency-domain Combining}. Alternatively, the value 0 can be used to indicate frequency-domain combing, while 1 can be used to indicate time-domain combining.

Type: binary bit.

Field length: 1 bit.

combMask: This parameter is the combining bitmask to indicate which RACH repetition should be combined in O-RU side. The accumulation of bit 1 in the mask should not be larger than numSymbol in the same control message. The MSB indicates the first PRACH repetition in time-domain, while the LSB indicates the latest repetition in time-domain. A value of 1 means that this specific PRACH repetition is to be combined with other repetitions of a value of 1. If the total number of repetitions is less than 12, O-DU 115 shall use the LSBs to indicate the bitmask to O-RU 105. As an example, for a combining of all the 6 repetition PRACH format B3, O-DU 115 shall set combMask as follows: 000000111111. In another embodiment, the O-DU can use the MSBs to indicate the bitmask to the O-RU. In another embodiment, the combining Mask, i.e., combMask, can be referred to as the repetition mask, i.e., repMask.

Value range: {000000000001b-111111111111b}.

Type: unsigned integer.

Field length: 12 bits powerScaler: This parameter is the scale factor which should be applied after O-RU 105 applied the repetition combing operation. The scaler can be represented as a fractional fixed-point value, which is in UQ1.15 format. In an alternative embodiment, the powerScaler may be represented in any format other than fixed-point representation. When no scaling is applied, the value of powerScaler should be set as 0x8000.

Value range: {0000101010101011b-1000000000000000b}.

Type: unsigned integer.

Field length: 16 bits

To maintain the thermal noise as power invariant after combination, the implicit power scaling factor $1/\sqrt{numCombSize}$ should be applied, which can make O-DU RACH subsequent processing not affected especially for preamble detection false alarm and miss detection parameters design. So, the coherent combining should be performed as:

$$\overline{R}_{rach} = \frac{1}{\sqrt{numCombSize}} \sum_{c=0}^{numCombSize} R_{rach,c}$$

where, numCombSize is described below as the number of PRACH repetitions to be combined together;

c is the index of the PRACH repetition. $R_{rach,c}$ is the PRACH repetition sequence; and $\overline{R}_{rach}$ is the combined PRACH sequence after power scaling is executed.

In an alternative embodiment, the powerScaler value is designed and selected solely by the vendor of O-DU 115.

In an alternative embodiment, O-DU 115 can use the numCombSize or numCombGroup to convey the number of repetitions to be combined together.

FIG. 5 shows an example embodiment in which numCombSize is used to indicate the number of repetitions to be combined at O-RU 105.

numCombSize: This parameter informs the combining granularity for RACH repetition, here numCombSize should not be bigger than numSymbol in the same control message.

Value range: {0001b-1100b}

Default value: 0001b

Type: unsigned integer

Field length: 4 bits

FIG. 6 shows an example in which numCombGroup is used to indicate the repetitions to be combined at O-RU 105.

numCombGroup: This parameter informs the combining granularity for RACH repetition. Here, current RACH configuration's repetition number divided by numCombGroup should not be greater than numSymbol in the same control message.

Value range: {0001b-1100b}.

Default value: 0001b

Type: unsigned integer.

Field length: 4 bits

FIG. 7 shows different possible values for the numCombSize field and number of repetition times for various short PRACH formats.

In an alternative embodiment, O-DU 115 can instruct O-RU 105 to combine any number of PRACH repetitions, while other repetitions can be reported individually by O-RU 105 to O-DU 115.

Static Combining Methods

In an example, O-RU controller 125 can configure O-RU 105 with the PRACH repetition combining parameters statically via M-plane interface 126. In this embodiment, O-RU controller 125 includes one or more of the above configurations such as TD/FD, combMask, powerScaler, numCombSize, numCombGroup as static configuration in the YANG module to O-RU 105.

Static configurations can be provided to O-RU 105 as part of carrier configuration, i.e., before the configured carrier is activated or updated by O-RU controller 125, if needed.

O-RU 105 exposes its ability to support static PRACH configuration by support of the feature PRACH-STATIC-CONFIGURATION-SUPPORTED in the o-ran-module-cap.yang module. The presence of this feature means, that at least one of static-low-level-rx-endpoints offered by O-RU 105 supports static configuration for PRACH.

O-RU controller 125 can include the required parameters for static PRACH combining at O-RU 105 in the u-plane conf YANG module. The static PRACH configuration parameters include:

a) Static-prach-config-id
b) pattern-period: Period after which static PRACH patterns are repeated. Unit: number of frames
c) guard-tone-low-re: Number of REs occupied by the low guard tones
d) num-prach-re: Number of contiguous PRBs per data section description
e) guard-tone-high-re: Number of REs occupied by the high guard tones
f) sequence-duration: Duration of single sequence of the PRACH. Sequence may be considered as 'single PRACH symbol'
g) prach-patterns:
    1) prach-pattern-id
    2) number-of-repetitions
    3) number-of-occasions
    4) re-offset
    5) occasion-parameters
        i) occasion-id
        ii) cp-length
        iii) gp-length
        iv) beam-id
    6) frame-number
    7) sub-frame-id
    8) time-offset
h) prach-coherent-combining:
    1) time-domain-combining
    2) frequency-domain-combining
    3) combining-mask
    4) combining-power-scaler
    5) combining-size
    6) combining-group O-RU 105 may use the parameters of the first PRACH repetition, e.g., symbolId, to fill the header and U-plane packet carrying the combined signal of the PRACH repetitions.

Any of the PRACH repetitions parameters, e.g., symbolId, can be used to fill the header and U-plane packet carrying the combined PRACH signal.

O-RU controller 125 may configure O-RU 105 to use the parameters of a specific repetition (first, second, etc.) to send the combined signal back O-DU 115.

Thus, the present document discloses a method of operating an Open Radio Access Network (O-RAN) fronthaul interface between O-RU 105 and O-RU controller 125 for controlling O-RU 105, where the method includes:

sending from O-RU 105 to O-RU controller 125, a message, i.e., data, informing whether O-RU 105 supports PRACH combining; and if O-RU 105 supports the PRACH combining, sending from O-RU 105 to O-RU controller 125, a report, i.e., data, of capabilities of O-RU 105, wherein the report includes:

i) an indication of whether O-RU 105 supports time-domain PRACH combining, frequency-domain PRACH combining, or both;
ii) the maximum number of PRACH repetitions that can be combined at O-RU 105, and the maximum supported gain value for time-domain combining; and
iii) the maximum number of PRACH repetitions that can be combined at O-RU 105, and the maximum supported gain value for frequency-domain combining.

O-RU controller 125 may be implemented in an SMO unit, O-DU 115, an NMS, or as a separate entity.

The present document also discloses a method of operating an Open Radio Access Network (O-RAN) fronthaul interface between O-RU 105 and O-RU controller 125 for controlling O-RU 105, where the method includes: configuring, by O-RU controller 125 or via the O-DU 115, PRACH combining configurations to O-RU 105 requesting O-RU 105 to perform PRACH combining based on at least one configuration parameter included in the combining configuration; and sending, by O-RU 105, one or more U-plane messages to O-DU 115 including the combined PRACH repetitions.

The combining configurations may be sent from O-RU controller 125 to O-RU 105 either (a) via M-plane interface 126, or (b) in a section extension appended to a C-plane message sent by O-DU 115 via fronthaul interface 110, and specifically the control plane (C-plane).

The combining configuration message via C-plane or static configurations includes at least one of:

i) combining method; either time-domain or frequency-domain;
ii) number of combined PRACH repetitions;
iii) combining mask;
iv) power scaler value;
v) combining size; or
vi) combining group.

The embodiments described herein show some exemplary parameter sets. The parameter set can be different as long as it can enable coherent combining on the O-RU side (for example, numCombSize can be replaced by numCombNumber equivalently which is the number of coherent combining).

Acronyms

3GPP: 3rd Generation Partnership Project
A1 Interface: Interface between Non-RT RIC in an SMO and Near-RT RIC for RAN Optimization
BS: Base Station
CA: Carrier Aggregation
CAPEX: Capital Expenditures
COTS: Commercial Off-The-Shelf
CP: Cyclic Prefix
C-plane: Control plane
C-RAN: Cloud Radio Access Network
CU: Centralized Unit
DL: Downlink
DU: Distributed Unit
eNB: e NodeB (applies to LTE)
FCAPS: Fault, Configuration, Accounting, Performance, Security
FFT: Fast Fourier Transform
FH: Fronthaul
gNB: g NodeB (applies to NR)
IFFT: Inverse Fast Fourier Transform
IQ: In-phase/Quadrature-phase
M-plane: Management plane
Near RT RIC: Near-Real-Time RAN Intelligent Controller
Non-RT RIC: O-RAN Non-Real-Time RAN Intelligent Controller
NR: New Radio
O1: Interface between SMO framework specified in O-RAN Architecture and O-RAN managed elements, for operation and management, by which FCAPS management, PNF software management, and file management are achieved
O2: Interface between SMO framework as specified in O-RAN architecture and the O-Cloud for supporting O-RAN virtual network functions
O-Cloud: A cloud computing platform that includes a collection of physical infrastructure nodes that meet O-RAN requirements to host relevant O-RAN functions (such as Near-RT RIC, O-CU-CP, O-CU-UP, and O-DU), supporting software components (such as Operating System, Virtual Machine Monitor, and Container Runtime), and management and orchestration functions
O-CU: O-RAN Centralized Unit
O-DU: O-RAN Distributed Unit
O-RAN: Open Radio Access Network
OAM: Operation and Management
O-RU: O-RAN Radio Unit
OPEX: Operating Expenditures
RACH: Random Access Channel
RAN: Radio Access Network
RB: Resource Block
RE: Resource Element
PRACH: Physical Random-Access Channel
PRB: Physical Resource Block
RPC: Remote procedure call
RU: Radio Unit
SCS: Subcarrier-spacing
S-plane: Synchronization plane
SMO: Service Management and Orchestration
U-plane: User plane
UE: User equipment
UL: Uplink
vBBU: Virtualized Baseband Unit Definitions Channel: The contiguous frequency range between lower and upper frequency limits.
C-plane: Control Plane: refers specifically to real-time control between O-DU and O-RU, and should not be confused with the UE's control plane.
DL: DownLink: data flow towards the radiating antenna (generally on the LLS interface).
LLS: Lower Layer Split: logical interface between O-DU and O-RU when using a lower layer (intra-PHY based) functional split.
M-Plane: Management Plane: refers to non-real-time management operations between the O-DU and the O-RU.
O-CU: O-RAN Control Unit—a logical node hosting PDCP, RRC, SDAP and other control functions.
O-DU: O-RAN Distributed Unit: a logical node hosting RLC/MAC/High-PHY layers based on a lower layer functional split.
O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).
OTA: Over the Air
S-Plane: Synchronization Plane: refers to traffic between the O-RU or O-DU to a synchronization controller which is generally an IEEE 1588 Grand Master (however, Grand Master functionality may be embedded in the O-DU).
U-Plane: User Plane: refers to IQ sample data transferred between O-DU and O-RU
UL: UpLink: data flow away from the radiating antenna (generally on the LLS interface)

What is claimed is:

1. A method of operating an Open Radio Access Network (O-RAN), comprising the steps of:

communicating from an O-RAN radio unit (O-RU) to an O-RU controller, data informing that the O-RU supports physical random-access channel (PRACH) combining;

communicating from the O-RU controller to the O-RU, in a section extension appended to a control plane message of section type 3, a parameter to facilitate the PRACH combining, wherein the parameter includes a combMask, wherein combMask is a 12-bit combining bitmask to indicate which RACH repetition is to be combined in O-RU side, and a powerScaler, wherein the powerScaler is a bit scale factor that is applied after O-RU applied the repetition combing operation; and configuring the O-RU in accordance with the parameter, wherein the powerScaler is applied after the PRACH combining.

2. The method of claim 1, further comprising the step of: sending from the O-RU to an O-RAN distributed unit, a combined signal in accordance with the PRACH combining.

3. The method of claim 1, further comprising the step of, prior to the step of communicating from the O-RU controller to the O-RU, the method further comprises the step of: communicating from the O-RU to the O-RU controller, data indicating a maximum number of PRACH repetitions that can be combined at the O-RU.

4. The method of claim 1, further comprising the step of, prior to the communicating from the O-RU controller to the O-RU: communicating from the O-RU to the O-RU controller, data indicating a maximum supported gain value for the PRACH combining.

5. The method of claim 1, wherein the PRACH combining comprises time-domain combining.

6. The method of claim 1, wherein the PRACH combining comprises frequency-domain combining.

7. The method of claim 1, further comprising communicating the parameter from the O-RU controller to the O-RU via a management plane interface, wherein the management plane interface is configured to transmit the parameter using a protocol that ensures secure data transmission.

8. The method of claim 1, wherein the step of communicating from the O-RU controller to the O-RU further comprises including the parameter in a section extension appended to a control plane message sent by an O-RAN distributed unit to the O-RU via a fronthaul interface.

9. An Open Radio Access Network Radio Unit (O-RU) comprising electronic circuitry configured to perform operations including:

sending to an O-RU controller, data informing that the O-RU supports physical random-access channel (PRACH) combining;

receiving in a section extension appended to a control plane message of section type 3, a parameter to facilitate the PRACH combining, wherein the parameter includes a combMask, wherein the combMask is a 12-bit combining bitmask to indicate which RACH repetition is to be combined in O-RU side, and a powerScaler, wherein the powerScaler is a 16-bit scale factor that is applied after O-RU applied the repetition combing operation; and configuring the O-RU in accordance with the parameter, wherein the powerScaler is applied after the PRACH combining.

10. The O-RU of claim 9, wherein the operations further include:

sending to an O-RAN distributed unit, a combined signal in accordance with the PRACH combining.

11. The O-RU of claim 9, wherein the operations further include:

prior to receiving the parameter, sending to the O-RU controller, data indicating a maximum number of PRACH repetitions that can be combined at the O-RU.

12. The O-RU of claim 9, wherein the operations further include:

prior to receiving the parameter, sending to the O-RU controller data indicating a maximum supported gain value for the PRACH combining.

13. The O-RU of claim 9, wherein the PRACH combining comprises time-domain combining.

14. The O-RU of claim 9, wherein the PRACH combining comprises frequency-domain combining.

15. The O-RU of claim 9, wherein the operation of receiving the parameter comprises receiving the parameter from the O-RU controller via a management plane interface.

16. The O-RU of claim 9, wherein the operation of receiving the parameter comprises receiving the parameter in a section extension appended to a control plane message sent by an O-RAN distributed unit to the O-RU controller via a fronthaul interface.

17. An Open Radio Access Network Radio Unit controller (O-RU controller) comprising electronic circuitry configured to perform operations including:

receiving from an Open Radio Access Network Radio Unit (O-RU), data informing that the O-RU supports physical random-access channel (PRACH) combining; and communicating to the O-RU, in a section extension appended to a control plane message of section type 3, a pararameter to facilitate the PRACH combining, wherein the parameter includes a combMask, wherein the combMask is a 12-bit combining bitmask to indicate which RACH repetition is to be combined in O-RU side, and a powerScaler, wherein the powerScaler is a 16-bit scale factor that is applied after O-RU applied the repetition combing operation;

wherein the O-RU is configured in accordance with the parameter.

18. The O-RU controller of claim 17, wherein the O-RU sends, to an O-RAN distributed unit, a combined signal in accordance with the PRACH combining.

19. The O-RU controller of claim 17, wherein the operations further include:

prior to communicating to the O-RU, receiving from the O-RU data indicating a maximum number of PRACH repetitions that can be combined at the O-RU.

20. The O-RU controller of claim 17, wherein the operations further include:

prior to communicating to the O-RU, receiving from the O-RU data indicating a maximum supported gain value for the PRACH combining.

21. The O-RU controller of claim 17, wherein the PRACH combining includes time-domain combining.

22. The O-RU controller of claim 17, wherein the PRACH combining includes frequency-domain combining.

23. The O-RU controller of claim 17, wherein the communicating to the O-RU includes sending the parameter to the O-RU via a management plane interface.

24. The O-RU controller of claim 17, wherein the communicating to the O-RU includes sending the parameter via an O1 interface to an O-RAN distributed unit (O-DU), wherein the O-DU sends the parameter to the O-RU in a section extension appended to a control plane message via a fronthaul interface.

* * * * *